United States Patent
Haigh

[11] 3,770,536
[45] Nov. 6, 1973

[54] METHOD OF MAKING AND INSTALLING A LAMINATED PRODUCT

[75] Inventor: John M. Haigh, Peabody, Mass.

[73] Assignee: Parkwood Laminates, Inc., Wakefield, Mass.

[22] Filed: May 9, 1969

[21] Appl. No.: 823,274

[52] U.S. Cl.................. 156/71, 156/182, 156/241, 156/289, 156/308, 156/309, 156/323, 156/338
[51] Int. Cl............................................ E04f 13/00
[58] Field of Search................... 156/239, 241, 278, 156/289, 308, 309, 320, 323, 338, 182, 71

[56] References Cited
UNITED STATES PATENTS

| | | | |
|---|---|---|---|
| 2,888,972 | 6/1959 | Boyce | 156/247 |
| 3,522,140 | 7/1970 | Hartzell et al. | 156/278 |
| 2,731,378 | 1/1956 | Strachan | 156/289 |
| 2,599,359 | 6/1952 | Banks et al. | 156/308 |
| 2,266,699 | 12/1941 | Williamson | 156/278 |
| 2,680,700 | 6/1954 | Meyers | 156/289 |
| 3,135,647 | 6/1964 | Wheeley | 156/247 |

Primary Examiner—Carl D. Quarforth
Assistant Examiner—F. M. Gittes
Attorney—Dawson, Tilton, Fallon and Lungmus

[57] ABSTRACT

A coating or rubber base elastomeric material is provided on the bottom ply of the laminate and completed by subsequently hot pressing the various laminate plies to achieve bonding. The rubber coating functions as an adhesive layer when the laminate is applied to a substrate which is prime coated with a similar rubber base coating modified with an adhesive binder. Both prime coating and laminate coating are dry, firm and nontacky. Adhesive bonding is achieved by mating the two coated surfaces.

2 Claims, 2 Drawing Figures

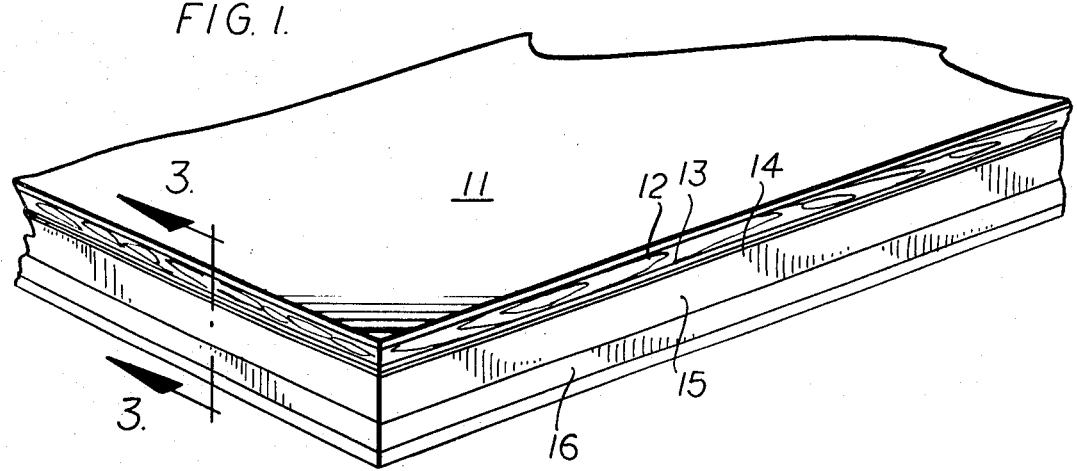
FIG. I.
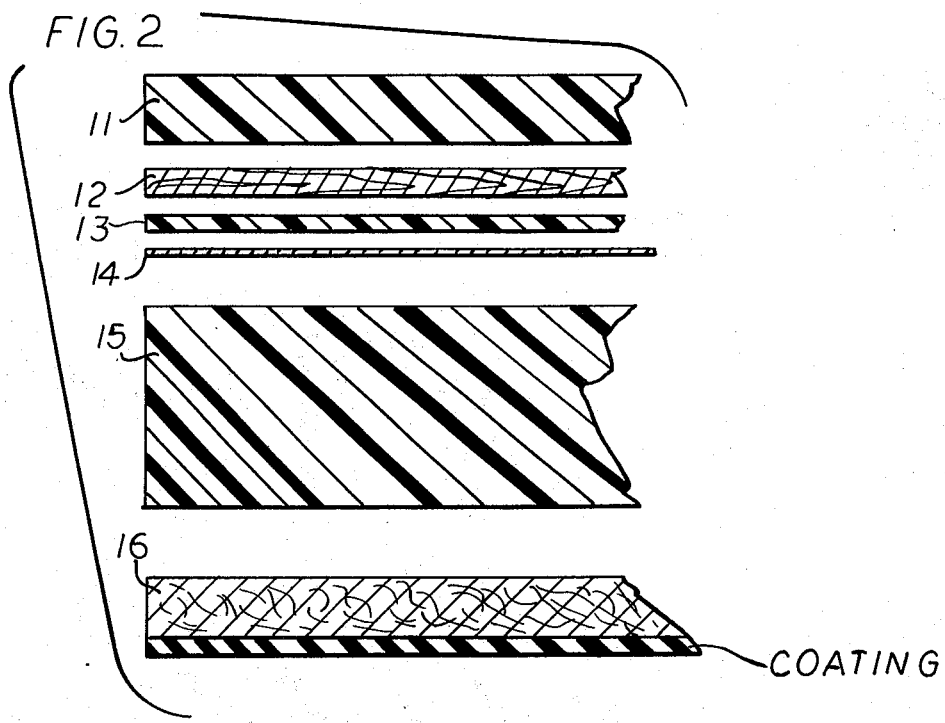
FIG. 2
COATING
INVENTOR
JOHN M. HAIGH
BY: Dawson, Tilton
Fallon & Lungmus
ATTY'S

METHOD OF MAKING AND INSTALLING A LAMINATED PRODUCT

BACKGROUND OF THE INVENTION

Laminated products are considered to be structured materials having various diverse components bonded together to provide a wide variety of functional and/or decorative properties.

Generally, the laminates of this invention have both decorative and functional components and are used as eye-pleasing surface coverings on walls, furniture, counter-tops, and floors. The style-conscious consumer today demands a variety of decorator colors, designs, and materials for surface applications that were unheard of a decade ago. The resulting show surfaces of decorative laminates have been upgraded immensely through the use of new designs and of new materials. As well as providing an appealing surface for his product, the laminator must also provide certain functional properties such as dimensional strength, water resistance, wear resistance and in general, the functional properties that result in the product having a degree of permanence once it is installed. In order to obtain the desired functional and decorative properties in his product, the laminator combines various plies having very different physical properties. The normal combining process used in the industry involves laying up the various plies of the laminate on press plates and applying pressure and temperature to fuse the various components into an integral product.

An inherent problem in multiple ply laminates is the variation in dimensional stability between the various plies of the laminate. A variation in dimensional stability within the finished laminate results in the laminate having a tendency to change shape and to curl. It is with specific reference to the application of curled or bowed laminated products that this disclosure is involved.

It is a recognized fact that when one of the ply components of a laminate loses or gains moisture at a faster rate than the remainder of the laminate structure, either tension or compression stresses are set up that can cause laminate curl. Many different laminate constructions exhibit curl phenomena, due to internal stress, as will be readily recognized by those familiar with the decorative laminate industry. The invention is practiced not by reducing internal stresses within a laminate but rather to provide a novel method for readily applying curled laminates to various substrates. In fact, the invention takes advantage of the fact that it is highly desirable to incorporate certain materials within a laminate that have a wide variation in dimensional stability relative to moisture content. A pertinent example of a laminate having components of different dimensional stability is a wood veneer-vinyl plastic floor covering product. The true beauty of natural wood in veneer form is incorporated in the laminate for its decorative properties. The wood veneer is laminated to flooring grade polyvinyl chloride (PVC) sheeting. The PVC sheeting is less expensive than the wood veneer and has desirable functional properties of strength and resilience. However, it is recognized that wood veneer swells and shrinks under variable moisture conditions to a much greater extent than PVC sheeting. Hence, a wood veneer-vinyl plastic floor tile has a tendency to curl.

The accepted industry practice for laying floor tile, of which PVC is a major component, is to cover the substrate or floor with a layer of mastic cement that will firm up and harden as it dries. While the mastic cement is still wet and pliable, the floor tiles are set into the mastic cement and usually rolled with a weight to insure adequate contact between the tiles and the cement. When the cement hardens, usually within two days, the tiles are firmly imbedded in the cement and attached to the floor. While this system is satisfactory for vinyl and vinyl-asbestos tiles, which do not have greatly different components regarding dimensional stability and have a tendency to lay flat and not curl, it is not satisfactory for tiles that have components of different dimensional stability, resulting in curl, and characteristic of the wood veneer-vinyl tile.

When an attempt is made to set the curled tile into a mastic cement, the tile has a tendency to return to its curled shape, resulting in a deficiency of mastic in the curled-up area and the overall result is a non-flat installation with cement deficiencies in certain areas that influence the permanence of the installation. When attempts are made to regulate the moisture content of the variable component, such as wood veneer, so that the tile is flat (i.e., not curled), when installed, problems also occur. While the tile may initially be flat when set into the mastic cement, the dimensionally unstable component such as the wood veneer will soon change its moisture content, depending on atmospheric humidity conditions and tends to curl. Curling stresses usually begin before the mastic cement has hardened sufficiently to hold the curling tile in place with the result that the tile again is not flat and is deficient in cement where it curled.

In dealing with dimensionally unstable products such as curled tiles, the installers have resorted to allowing the cement to dry to a high degree of tack before setting in the tiles. The problem with this approach is that the more the cement dries the harder it is to obtain adequate contact and sealing of the tiles in the cement. Consequently, a great deal of pressure and time (subjectively, patience) are required to install curled tiles by this method. The overall result is unsatisfactory due to the narrow "open" time of the adhesive, when it is dried enough.

Another approach used by installers with dimensionally unstable or curled tiles is to use a contact cement system. This system requires that both the substrate or floor and the tile be coated with the same adhesive. After the adhesive on the tile and the floor has dried the tile is placed in contact with the floor. This system will hold down curled tiles. However, the process is very time consuming and expensive to the extent that it is rarely utilized. The contact cement system requires that each individual tile be coated and this is time consuming. The contact cement is solvent based, hence, both toxic and ignitable. Also the contact system does not allow for movement or repositioning of the tiles once they are laid.

Recognizing that it is highly desirable to use dimensionally unstable materials such as wood veneer and dimensionally stable materials such as flooring grade PVC sheeting in the same laminate structure, it would be most advantageous for installers to be able to simply install curled laminates without the shortcomings and limitations of the conventional adhesive systems referred to above.

Consequently, it is an object of this invention to provide a laminated product containing a dimensionally unstable component susceptible to curl which can be applied to various substrates with an ease of installation heretofore unobtainable.

Another object of this invention is to provide a method for applying dimensionally unstable laminates (as of a cellulosic ply such as wood veneer and a thermoplastic such as polyvinyl chloride) which is essentially free of the limitations and short comings normally associated with the installation of curled laminates.

A further object of this invention is to provide a novel method for manufacturing a laminate that has an inchoate adhesive coating on the bonding surface of the laminate.

Another object of this invention is to provide an improved laminate installation method that is faster and cleaner than was heretofore obtainable.

An additional object of this invention is to provide a laminate installation method whereby the open time of the adhesive is not critical.

Other objects and advantages of this invention will be apparent from the ensuing description and the appended claims.

DETAILED DESCRIPTION

The invention is described in conjunction with the accompanying drawing in which FIG. 1 is a perspective view of a laminated product, partly broken away to show the inventive construction; and FIG. 2 is an exploded elevational view of the FIG. 1 product.

The invention is practiced through the use of an improved method of manufacturing and applying laminated products. This method includes:

1. Applying a rubber base elastomeric coating to the exterior surface of the bottom ply of the laminate and subsequently drying this coating to a non-tacky state.
2. Laying up the various components of the laminate structure so that said coating on the bottom ply is the exterior surface of the laminate structure and adjacent to a flexible release sheet.
3. Applying heat and pressure to the assembled laminate structure for a period of time sufficient to bond together said various components of the laminate structure.
4. Removing from the press the laminated structure containing a bondable back, in the form of the rubber base elastomeric coating, the bondable back being weakly attached to the release sheet.
5. Preparing for the application of the bondable back laminated structure by applying to the application substrate a primer coating including the rubber base elastomeric coating and an adhesive binder, the primer coating being allowed to dry tack-free.
6. Applying the bondable back laminated structure by removing the release sheet from the bondable back laminate and contacting the laminated structure with the primer coating on the substrate.

Pursuant to this invention, the application of a rubber base elastomeric coating to the exterior ply component of the laminate structure has decided advantages. In the first place, the coating will effect an actual adhesive bond when it is contacted with a similar material such as the primer coating on the substrate even though the laminate coating is non-tacky and dry and exhibits non-adhesive characteristics to dissimilar materials. The phenomena of contact "grab" or the ability of rubber adhesives to bond to themselves when dry and non-tacky is characteristic of certain rubber adhesives, most notably natural rubber latex from the Hevea Brasiliensis species of tree. Natural rubber latex is the preferred rubber base elastomeric for both the laminate ply coating and the substrate primer coating due to its ability to retain its adhesive bonding potential to itself or a similar material for extended periods of time. Laminate ply coatings as disclosed in this invention have provided adhesive bonds adequate to hold down curled laminates when they were installed over one year after manufacture. In order to extend the adhesive potential of the rubber laminate coating, it has been found advantageous to add a rubber antioxidant additive to the coating.

It is a unique and unexpected discovery of this invention that rubber coatings on the laminate ply will withstand laminating pressures and temperatures and still have an adhesive bond potential for extended times prior to actual product application. Pursuant to this invention, a natural rubber latex coating containing an antioxidant withstood a laminating cycle of 1,000 psi at 280° F. for 25 minutes and still adequately held down the curled laminate made using this cycle when installed one year after being manufactured.

An additional unique result of this invention is that it has been discovered that the laminating cycle greatly increases the bond between the rubber coating and the exterior laminate ply. It was recognized that while natural and unmodified rubbers form strong bonds to themselves and similar materials, their adhesion to dissimilar materials is low. Attempts to increase adhesion of rubber elastomers to dissimilar materials resulted in a decrease in the adhesive bonding potential to themselves or similar materials. Consequently, in order to obtain maximum adhesion potential and capability, relative to time, in the laminate coating, it was deemed desirable not to add modifying bonding agents for securing the attachment of the rubber coating to the laminate. In light of this, it was unexpected to find that the laminating cycle causes a strong bond to form between the unmodified rubber coating and the laminate during the press cycle. In all probability the bond between the rubber coating and the laminate that is induced in the press cycle is the result of a pressure-vulcanizing effect causing a mechanical bond at the rubber coating-laminate interface.

As indicated above, the practice of this invention allows the major portion of the total adhesive required for the installation of the laminate product to be incorporated in the product during the manufacturing process. By way of example, the product of the invention is described in the manufacture of a wood veneer vinyl flooring product as schematically pictured in the drawing. The various ply components of the laminate structure are, proceeding from top to bottom: 11 is a 14 mil clear vinyl film; 12 is a 1/85 inch wood veneer; 13 is a 4 mil opaque vinyl film; 14 is a 1 ½ mil aluminum foil; 15 is a 45 mil flooring grade vinyl; and 16 is a 15 mil asbestos felt. It is clear to those skilled in the art that the wood veneer component will show a degree of dimensional instability significantly different from the remaining components. The asbestos felt ply, being the exterior application surface of the laminate, is the surface to which the rubber coating is applied. Natural rubber latex incorporating an antioxidant being the preferred embodiment of this invention for coating the exterior laminate ply, is normally supplied as a water base emulsion and is readily applied to the outside surface of the asbestos felt by simple spreading devices such as a roll coater. Preferably, 5 to 15 lbs. of dry coating is applied to each 1000 square feet of asbestos felt. Normal hot air or infrared heaters can be used to dry the rubber coating. Drying is fairly rapid as it is preferred to apply the coating at 50 percent solids, although advantageous results are obtained with emulsions having from about 25 percent to about 75 percent solids. The dried coating is firm and non-tacky and will not adhere to dissimilar surfaces. Dissimilar surfaces are further characterized as not being of a similar composition to the rubber coating. The rubber coated asbestos felt is laid up in its correct position in the laminate structure with the rubber coating being the exterior surface. Between the rubber coating and the press plate or platen is placed a flexible release-treated sheet. The preferred release sheet is a 40 lb. silicone treated parchment which will remain loosely attached to the rubber coating until the laminated product is ready for installation.

The laminate as described above and depicted schematically in FIG. 2 is placed between press platens and pressed at 300 psi and 275° F. for 20 minutes, resulting in a good laminate bond between all laminate plies. Temperatures in the range of about 200° F. to about 400° F. may be employed to advantages with pressures in the range of about 100 to 1,500 psi. from the press and prepared for product finishing and shipment.

Having manufactured a laminate containing a dimensionally unstable component, the result of which tends to induce curl in the product, and incorporating an inchoate adhesive on the exterior surface of the laminate, the further teaching of this invention shows how the inchoate adhesive is caused to securely attach to a substrate during the application of the product in a simple manner sufficient to hold down and maintain with a degree of performance the curled product. The unique characteristic of the rubber coating on the finished laminate is that it will form a strong bond when contacted to a similar material. Consequently, the installation of the rubber coated laminate of this disclosure is readily accomplished with an ease heretofore unknown to the art by simply prime coating the installation substrate with a similar modified rubber, allowing the prime coating to dry completely and simply contacting with pressure the rubber coated laminate and the prime coating. Inasmuch as both the prime coating on the application substrate and the coating on the laminate are both completely dry and firm, no movement takes place in the adhesive when the laminate is set in place. While lack of adhesive movement during bond is desirable in many applications, it is essential during the bond formation and application of curled laminates. Obviously, if the adhesive is capable of movement when a curled or nonflat laminate is set in place the adhesive will tend to move and stretch as the laminate resumes a curled position where the stresses in the laminate are in equilibrium. It can readily be seen from the foregoing why conventional mastic cements that require the laminate or tile to be set in place before the mastic has dried and while it is still capable of movement are unsatisfactory for curled laminates or tiles. It will be obvious to those skilled in the art of laminate installation, such as wall paneling and floor tiles, that the ease of installation of the product and method of this disclosure represents a dramatic and time saving contribution to the art.

In further defining the nature of the substrate prime coating it should be again mentioned that rubber base coating, and particularly natural rubber base unmodified latices exhibit low adhesion values to dissimilar materials such as substrates to which the laminate will be applied. It is because of this low adhesion factor that it has been found advantageous to good substrate adhesion to incorporate a compatible adhesive binder along with the rubber base in the prime coating. Examples of adhesive binders that are compatible with rubber base adhesives are well known in the art. However, to mention a few that have been found to be satisfactory are the acrylic emulsions, and the water soluble proteins such as casein and soya protein. While various amounts of the adhesive binder can be incorporated in the prime coating, it is preferred to use between 10 percent and 50 percent of adhesive binder, based on the weight of the rubber component in the primer coating.

By way of example, the wood veneer-vinyl flooring tile previously described and depicted in FIG. 1 was cut into 9 inch × 9 inch tiles and installed by the method of this disclosure. The tiles exhibited a definite concave curl and would spring back to their original curl position when attempts were made to lay them flat. In the method of this disclosure substrates of both underlayment grade plywood and smooth cement were prime coated with 12 lb. dry weight per 1,000 square feet of a coating consisting of 100 parts natural rubber latex with antioxidant and 25 parts acrylic binder. The prime coating was a 60 percent solids water emulsion and air dried tack-free in ½ hour.

This application of the tiles was accomplished by removing the protective release sheet and contacting the tiles to the prime coated substrate. An immediate and strong bond was obtained sufficient to hold down and maintain down the curled tiles on both the plywood and the cement. As an indication of the degree of open time with this system, the prime coating was allowed to age on the substrate for three weeks prior to application of the tiles. Again completely adequate hold down adhesive bonds were obtained between the tiles and the aged prime coated substrates. Prior to this invention, no adhesive system has been available for installing laminates that exhibited an open time of more than a few hours.

In summary, the invention makes use of a product assembled from a plurality of plies. One ply may be a cellulosic material arranged to give the appearance of natural wood. Exemplary of this is a wood veneer. Another of the plies is a thermoplastic material readily integrated with wood veneer, and a contemporary, inexpensive film for this purpose is polyvinyl chloride. A third ply constituting the bottom facing ply where the product is to be installed as a floor tile is asbestos or like coating-receptive material.

For the elastomeric coating, I employ from about 5 pounds to about 15 pounds (on a dry basis) for each 1,000 square feet of product. The coating is applied to the asbestos or like adhesive-receptive ply in the form of an aqueous emulsion having from about 25 percent to about 75 percent solids. Excellent results are obtained with a 50 percent emulsion. The emulsion, in its solid content, is substantially the rubber base elastomer fortified with from about 1 percent to about 10 percent of an antioxidant material. Various rubber antioxidants are known to this art, and thus far I have ascertained no criticality in character of the antioxidant, employing commercially available products therefor.

After the elastomeric coating has been applied to the asbestos ply, the same is dried to a non-tacky condition, — advantageously, by hot air or infrared lamps. The coated asbestos ply and the other plies are assembled in face-to-face, contacting condition, and installed in a press. A release material, such as a silicone-treated parchment of 40 pound ream weight, is interposed between one platen of the press and the elastomeric coating.

A variety of integrating conditions may be employed, including pressures of the order of 100 to about 1,500 psi, with a preferred range being about 300 psi to about 1,000 psi. The other parameters of heat and time may range from about 200° F. to about 400° F., and from about 10 minutes to about 30 minutes, depending to a certain extent on the characteristics of the press.

The prime coating applied to the substrate also is advantageously in the range of about five pounds to about 15 pounds (dry basis) to about 1,000 square feet. This is employed in the form of an aqueous emulsion having from about 25 percent to about 75 percent solids, with the preferred range being 50 percent to about 60 percent solids. The solids content of the aqueous emulsion includes, as above, a few per cent of an antioxidant material, and from about 5 percent to about 50 percent of a binder such as the acrylic material, casein or soya protein mentioned above. Preferably, the percentage of the binder is of the order of 25 percent of the weight of the rubber base elastomer. Following the teachings set forth above, I find the invention capable of providing a strong union between the laminated product and the substrate even after one week has elapsed following the application of the prime coat to the substrate and before the laminated product is applied to the prime coat.

I claim:

1. A method of manufacturing and installing a laminated product as a covering for walls, floors, and furniture, comprising applying from about 5 to about 15 pounds of a 25–75 percent emulsion of a rubber base elastomeric coating having from about 1 percent to about 10 percent of an antioxidant therein to each 1,000 square feet of a surface of an asbestos felt ply to be incorporated into said product, drying said coating to a non-tacky state, assemblying a ply of thermoplastic material in contacting relation with said asbestos felt ply, and with said coating facing outwardly, assembling a plurality of plies adjacent said thermoplastic material ply, one of the plies in said plurality being constructed of a material having a dimensional stability different from said thermoplastic material ply, applying heat of the order of about 200°–400° F. and pressure of the order of about 100–1,500 p.s.i. to the plies to provide an integrated assembly while a release sheet is positioned in contact with said coating, removing said release sheet and contacting the coating of said asbestos felt ply to a substrate previously covered with a prime coating and dried to a tack-free condition and comprising from about 1 percent to about 10 percent of an antioxidant, from about 5 percent to about 50 percent of a binder, with the remainder being a rubber base elastomeric material.

2. The method of claim 1 in which said rubber base elastomeric material is a natural rubber latex derived from the Hevea Brasiliensis species of tree.

* * * * *